United States Patent
Perets et al.

(10) Patent No.: US 8,831,690 B2
(45) Date of Patent: *Sep. 9, 2014

(54) UPLINK POWER CONTROL IN SUBCARRIER-BASED AGGREGATED SPECTRUM SYSTEMS

(71) Applicant: Marvell World Trade Ltd., St. Michael (BB)

(72) Inventors: Yona Perets, Ra'anana (IL); Ezer Melzer, Tel Aviv (IL); Itsik Bergel, Givat Shmuel (IL)

(73) Assignee: Marvell World Trade Ltd., St. Michael (BB)

( * ) Notice: Subject to any disclaimer, the term of this patent is extended or adjusted under 35 U.S.C. 154(b) by 61 days.

This patent is subject to a terminal disclaimer.

(21) Appl. No.: 13/669,480

(22) Filed: Nov. 6, 2012

(65) Prior Publication Data

US 2013/0058300 A1  Mar. 7, 2013

Related U.S. Application Data

(63) Continuation of application No. 13/400,078, filed on Feb. 19, 2012, now Pat. No. 8,320,977, which is a continuation of application No. 12/348,375, filed on Jan. 5, 2009, now Pat. No. 8,150,478.

(60) Provisional application No. 61/081,130, filed on Jul. 16, 2008, provisional application No. 61/115,714, filed on Nov. 18, 2008.

(51) Int. Cl.
  *H04B 1/38* (2006.01)
  *H04W 52/08* (2009.01)
  *H04W 52/10* (2009.01)
  *H04W 52/14* (2009.01)

(52) U.S. Cl.
  CPC .............. *H04W 52/08* (2013.01); *H04W 52/10* (2013.01); *H04W 52/146* (2013.01)
  USPC .......................................... 455/574; 455/522

(58) Field of Classification Search
  CPC ... H04W 52/08; H04W 52/10; H04W 52/146; H04W 52/16; H04W 52/34
  USPC ........... 455/403, 405, 414.1, 419, 420, 435.2, 455/435.3, 445, 452.1, 452.2, 454, 515, 61, 455/62, 550.1, 522, 574, 512, 513; 370/318, 329, 332, 441; 375/146, 147, 375/130, 131
  See application file for complete search history.

(56) References Cited

U.S. PATENT DOCUMENTS 6,512,750 B1   1/2003   Palenius
6,757,319 B1   6/2004   Parsa et al.
(Continued)

FOREIGN PATENT DOCUMENTS

EP   0955736 A2   11/1999
EP   1898540 A1   3/2008
(Continued)

OTHER PUBLICATIONS

U.S. Appl. No. 12/499,807 Office Action dated Jan. 31, 2013.
(Continued)

*Primary Examiner* — Jean Gelin

(57) ABSTRACT

A method for communication includes modulating data in a wireless communication terminal to produce an aggregated-spectrum signal, which includes multiple component carriers in multiple respective spectral bands, each component carrier including a respective plurality of sub-carriers in respective frequency bins, wherein the component carriers are grouped in one or more groups. The modulated data in transmitted on the multiple component carriers at respective power levels. A single instruction, to set a power level of the component carriers in a given group, is received at the wireless communication terminal. The power level of the component carriers in the given group is set based on the single instruction, and while preserving relative power ratios among the sub-carriers within each of the component carriers.

20 Claims, 5 Drawing Sheets

(56) References Cited

U.S. PATENT DOCUMENTS

| | | | |
|---|---|---|---|
| 6,768,727 | B1 | 7/2004 | Sourour et al. |
| 7,184,791 | B2 | 2/2007 | Nilsson et al. |
| 8,099,139 | B1 | 1/2012 | Zaslavsky et al. |
| 8,150,478 | B2 | 4/2012 | Perets et al. |
| 8,320,977 | B2 | 11/2012 | Perets et al. |
| 2001/0019577 | A1 | 9/2001 | Ha |
| 2006/0045062 | A1 | 3/2006 | Gorokhov et al. |
| 2006/0274712 | A1 | 12/2006 | Malladi et al. |
| 2007/0110100 | A1 | 5/2007 | Wunder et al. |
| 2007/0141994 | A1 | 6/2007 | Cheng |
| 2007/0149229 | A1 | 6/2007 | Frederiksen et al. |
| 2007/0183591 | A1 | 8/2007 | Geile et al. |
| 2007/0253466 | A1 | 11/2007 | Jones et al. |
| 2007/0259671 | A1 | 11/2007 | Cheng et al. |
| 2008/0081655 | A1 | 4/2008 | Shin et al. |
| 2008/0108365 | A1 | 5/2008 | Buddhikot et al. |
| 2008/0207135 | A1 | 8/2008 | Varadarajan et al. |
| 2008/0229177 | A1 | 9/2008 | Kotecha |
| 2009/0163157 | A1 | 6/2009 | Zolfghari |
| 2009/0224973 | A1 | 9/2009 | Nayyar |
| 2009/0257533 | A1 | 10/2009 | Lindoff et al. |
| 2009/0258628 | A1 | 10/2009 | Lindoff et al. |
| 2009/0264120 | A1 | 10/2009 | Karabinis |
| 2009/0279480 | A1 | 11/2009 | Rosenqvist et al. |
| 2009/0300456 | A1 | 12/2009 | Pelletier et al. |
| 2009/0316659 | A1 | 12/2009 | Lindoff et al. |
| 2010/0015967 | A1 | 1/2010 | Perets et al. |
| 2010/0172279 | A1 | 7/2010 | Chen et al. |
| 2012/0028592 | A1 | 2/2012 | Pick et al. |

FOREIGN PATENT DOCUMENTS

| | | |
|---|---|---|
| EP | 2012552 A1 | 1/2009 |
| WO | 97/02665 A2 | 1/1997 |
| WO | 00/01084 A1 | 1/2000 |

OTHER PUBLICATIONS

Japanese Patent Application # 2011519272 Office Action dated Mar. 26, 2013.
Research in Motion, UK Limited, "Uplink Power Control for Carrier Aggregation", 3GPP TSG RAN WG1 Meeting # 57b, Lon Angeles, USA, Jun. 29-Jul. 3, 2009.
Nokia Siemens Networks, "PUSCH Power Control for LTE-Advanced", 3GPP TSG RAN WG1 Meeting # 57bis, Los Angeles, USA, Jun. 29-Jul. 3, 2009.
3rd Generation Partnership Project; Technical Specification Group Radio Access Network; Radio Frequency (RF) System Scenarios (Release 5), 3GPP TR 25.942 V5.3.0, Sophia Antipolis, France, Jun. 2004.
Nokia Siemens Networks, "Autonomous Component Carrier Selection for LTE Advanced", 3GPP TSG RAN WG1 Meeting #54, Jeju Island, Korea, Aug. 18-22, 2008.
Nokia Siemens Networks, "Algorithms and Results for Autonomous Component Carrier Selection for LTE-Advanced", 3GPP TSG RAN WG1 Meeting #55, Prague, Czech Republic, Nov. 10-14, 2008.
Nokia Siemens Networks, "Use of Background Interference Matrix for Autonomous Component Carrier Selection for LTE-Advanced", 3GPP TSG RAN WG1 Meeting #55-bis, Ljubljana, Slovenia, Jan. 12-16, 2009.
Qualcomm Europe, Notion of Anchor Carrier in LTE-A, 3GPP TSG RAN WG1 Meeting #55-bis, Ljubljana, Slovenia, Jan. 12-16, 2009.
Samsung, "UL Transmission Power Control in LTE-A", 3GPP TSG RAN WG1 Meeting #56bis, Seoul, Korea, Mar. 23-27, 2009.
NTT Docomo et al., "Prioritized Deployment Scenarios for LTE-Advanced Studies", 3GPP TSG RAN WG4 Meeting # 50, Athens, Greece, Feb. 9-13, 2009.
Nokia Siemens Networks, "LTE-Advanced SU-MIMO UE Transmission in LTE Release 8 Network", 3GPP TSG RAN WG1 Meeting #57, San Francisco, USA, May 4-8, 2009.
3rd Generation Partnership Project; Technical Specification Group Radio Access Network; Further Advancements for E-UTRA Physical Layer Aspects (Release 9), 3GPP TR 36.814 V0.4.1, Sophia Antipolis, France, Feb. 2009.
3rd Generation Partnership Project; Technical Specification Group Radio Access Network; Evolved Universal Terrestrial Radio Access (E-UTRA); Physical Later Procedures (Release 8), Draft 3GPP TS 36.213, V8.6.0, Sophia Antipolis, France, 2009.
Huawei, "The Impact of CA on Mobility in LTE-A", 3GPP TSG RAN WG1 Meeting #56, Athens, Greece, Feb. 9-13, 2009.
3rd Generation Partnership Project; Technical Specification Group Radio Access Network; Requirements for Further Advancements for Evolved Universal Terrestrial Radio Access (E-UTRA) (LTE-Advanced) (Release 8), 3GPP TR 36.913 V8.0.1, Sophia Antipolis, France, Mar. 2009.
3rd Generation Partnership Project; Technical Specification Group Radio Access Network; Evolved Universal Terrestrial Radio Access (E-UTRA); Physical layer procedures (Release 8), 3GPP TS 36.213, V8.4.0, Sophia Antipolis, France, Sep. 2008.
Nortel, "On the discussions of carrier aggregations", 3GPP TSG-RAN Working Group 1 Meeting #55, Prague, Czech Republic, Nov. 10-14, 2008.
NTT Docomo, Inc., "Updated Views on Support of Wider Bandwidth in LTE-Advanced", 3GPP TSG RAN WG1 Meeting #54bis, Prague, Czech Republic, Sep. 29-Oct. 3, 2008.
3rd Generation Partnership Project; Technical Specification Group Radio Access Network; User Equipment (UE) radio transmission and reception (FDD) (Release 8), 3GPP TS 25.101, V8.5.1, Sophia Antipolis, France, Jan. 2009.
Ericsson, "Carrier Aggregation in LTE-Advanced", TSG-RAN WG1 #53bis, Warsaw, Poland, Jun. 30-Jul. 4, 2008.
Alcatel-Lucent, "Fractional power Control using Pilot Power Ratio Measurements for the E-UTRA Uplink", 3GPP TSG-RAN WG1 #48, St. Louis, USA, Feb. 12-16, 2007.
Motorola, "Uplink Power Control for E-UTRA", 3GPP TSG RAN1 #48, St. Louis, USA, Feb. 12-16, 2007.
Motorola, "Interference Mitigation via Power Control and FDM Resource Allocation and UE Alignment for E-UTRA Uplink and TP", 3GPP TSG RAN1 #44, Denver, USA, Feb. 13-17, 2006.
Rapporteur (NTT DOCoMo), "Text proposal for RAN1 TR on LTE-Advanced", 3GPP TSG RAN WG1 Meeting #53bis, Warsaw, Poland, Jun. 30-Jul. 4, 2008.
International Application PCT/IB09/52987 Search Report dated Jan. 27, 2010.
U.S. Appl. No. 12/499,807 Office Action dated Oct. 11, 2012.
International Application PCT/IB2009/053164 Search Report dated Aug. 4, 2011.
U.S. Appl. No. 12/348,375 Official Action dated Jun. 21, 2011.
U.S. Appl. No. 12/348,375 Official Action dated Sep. 15, 2011.
U.S. Appl. No. 12/499,807 Official Action dated Nov. 10, 2011.
European Patent Application # 09797612.0 Extended Search Report dated Feb. 3, 2012.
Jarot et al., "Each Carrier Transmission Power Control for the Reverse Link of OFDM-DS-CDMA System", IEICE Transactions on Communications, vol. E82-B, No. 11, pp. 1851-1857, Nov. 1, 1999.
U.S. Appl. No. 13/400,078 Official Action dated May 1, 2012.
U.S. Appl. No. 12/499,807 Official Action dated Mar. 14, 2012.
JP Patent Application # 2011519272 Office Action dated Sep. 11, 2012.
EP Patent Application # 09797612.0 Office Action dated Aug. 22, 2012.
NTT Docomo, Inc., "Proposals for LTE-Advanced Technologies", 3GPP TSG RAN WG1 Meeting # 53, Kansas City, USA, May 5-9, 2008.
International Application PCT/IB2011/052803 Search Report dated Dec. 2, 2011.
JP Patent Application No. 2011-518043 Office Action dated Oct. 23, 2012.

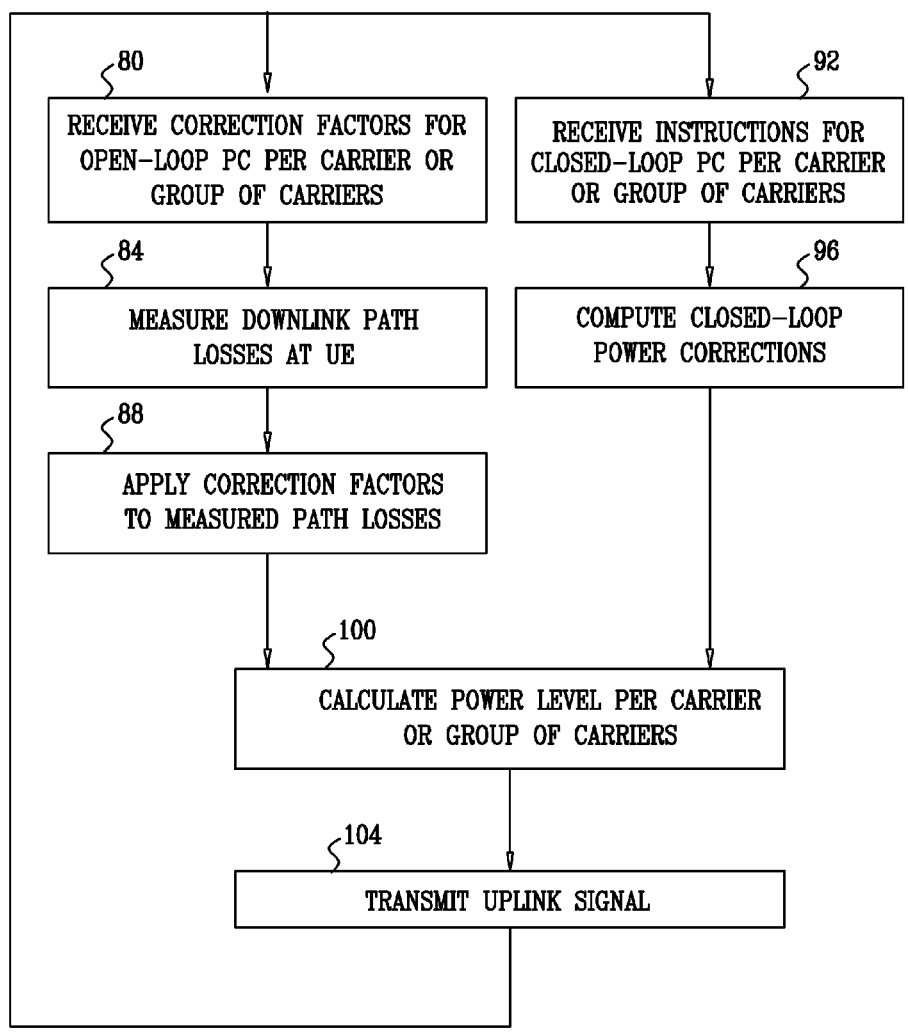

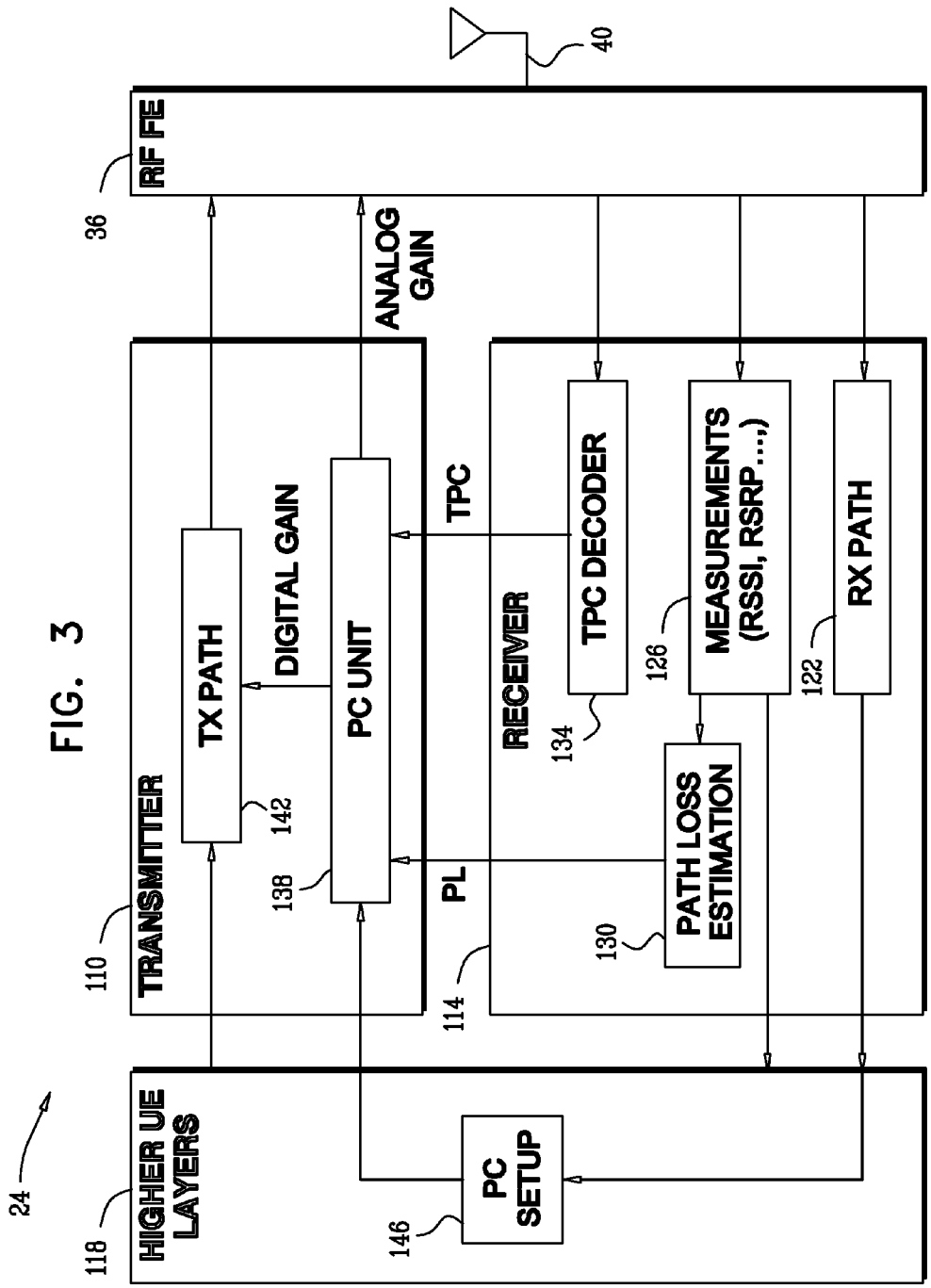

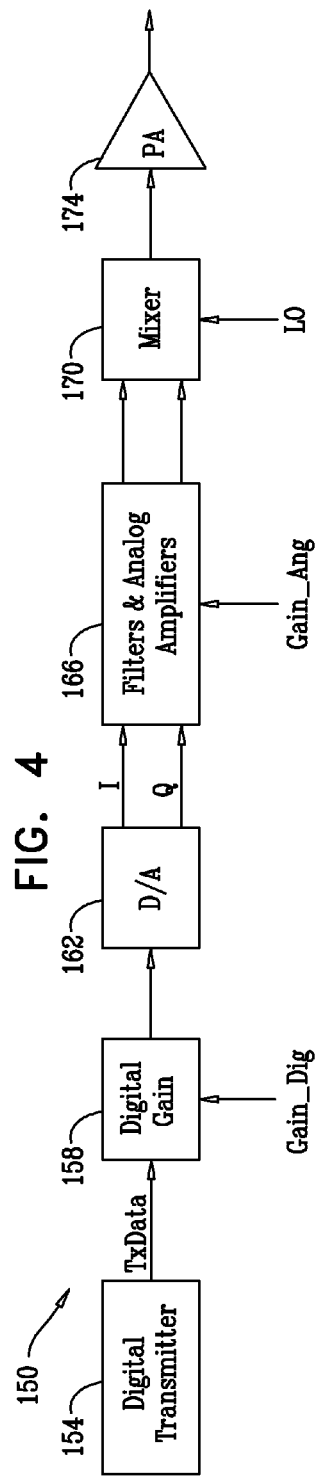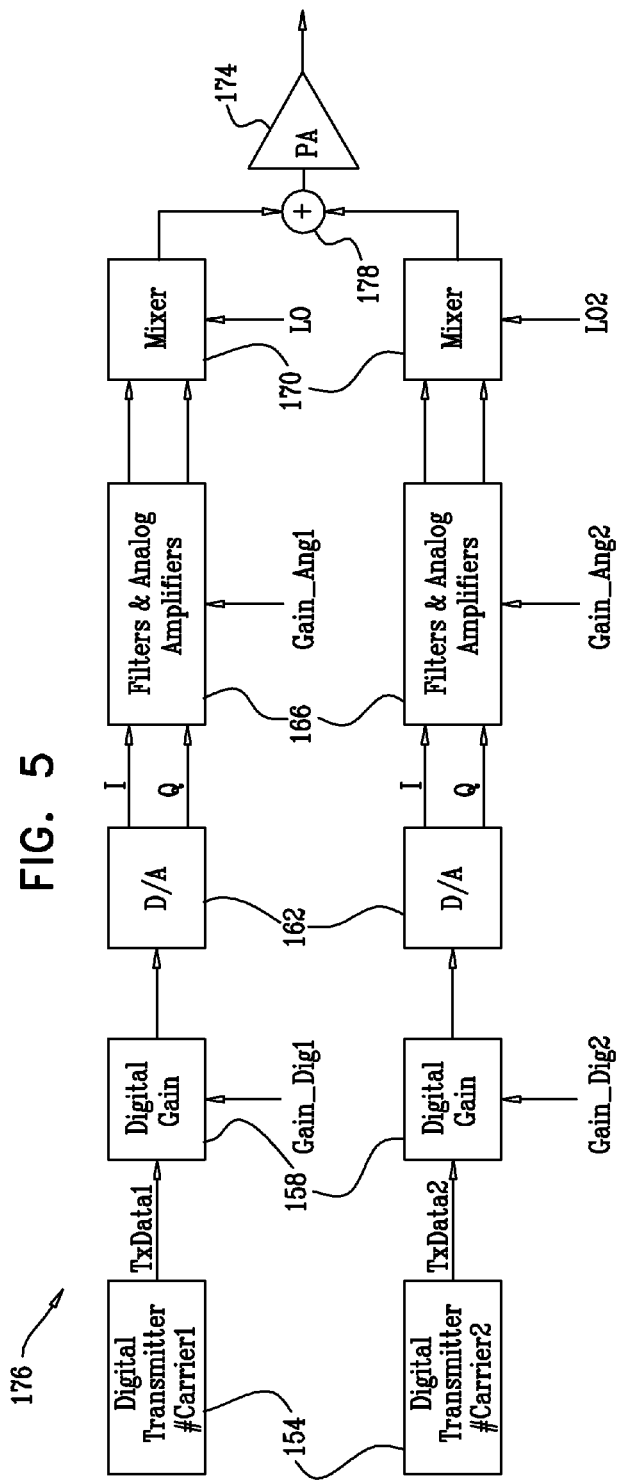

UPLINK POWER CONTROL IN SUBCARRIER-BASED AGGREGATED SPECTRUM SYSTEMS

CROSS-REFERENCE TO RELATED APPLICATIONS

This application is a continuation of U.S. patent application Ser. No. 13/400,078, filed Feb. 19, 2012, which is a continuation of U.S. patent application Ser. No. 12/348,375, filed Jan. 5, 2009, which claims the benefit of U.S. Provisional Patent Application 61/081,130, filed Jul. 16, 2008, and U.S. Provisional Patent Application 61/115,714, filed Nov. 18, 2008. The disclosures of all these related applications are incorporated herein by reference.

FIELD OF THE DISCLOSURE

The present disclosure relates generally to communication systems, and particularly to methods and systems for power control in wireless communication systems.

BACKGROUND

Various communication systems modify the power of transmitted signals in order to adapt to current channel conditions. Such techniques are commonly referred to as power control. For example, $3^{rd}$ Generation Partnership Project (3GPP) Evolved Universal Terrestrial Radio Access (E-UTRA) systems apply power control to the uplink signals. The uplink power control methods applied in E-UTRA systems are specified, for example, in 3GPP Technical Specification 36.213, entitled "Technical Specification Group Radio Access Network; Evolved Universal Terrestrial Radio Access (E-UTRA); Physical Layer Procedures (Release 8)," (3GPP TS 36.213), version 8.4.0., September, 2008, which is incorporated herein by reference.

E-UTRA is also commonly known as Long-Term Evolution (LTE). An advanced version of E-UTRA, which is commonly known as LTE-Advanced (LTE-A), is currently being specified by the 3GPP standardization bodies. In the context of the present patent application and in the claims, the term "E-UTRA specification" refers to any E-UTRA, LTE or LTE-A specification, as well as to subsequent versions of these specifications.

Uplink power control is useful, for example, for reducing interference and increasing spectral efficiency in cellular communication networks. Some aspects of interference mitigation and spectral efficiency improvement are addressed in a report published by the 3GPP Technical Specification Group Radio Access Network Working Group 1 (TSG-RAN WG1), entitled "Interference Mitigation via Power Control and FDM Resource Allocation and UE Alignment for E-UTRA Uplink and TP," (R1-060401), Denver, Colo., Feb. 13-17, 2006, which is incorporated herein by reference. Uplink power control in E-UTRA systems is also discussed in TSG-RAN WG1 report R1-070795, entitled "Uplink Power Control for E-UTRA," Saint-Louis, Mo., Feb. 12-16, 2007, which is incorporated herein by reference.

Some LTE-A systems deploy carrier aggregation techniques, in which a wireless terminal communicates with a base station over multiple aggregated LTE or LTE-A carriers to provide high bandwidth capabilities. Carrier aggregation (also referred to as spectrum aggregation) is described, for example, in TSG-RAN WG1 report R1-082468, entitled "Carrier Aggregation in LTE-Advanced," Warsaw, Poland, Jun. 30-Jul. 4, 2008, which is incorporated herein by reference.

SUMMARY

An embodiment that is described herein provides a method for communication:

In a wireless communication terminal, data is modulated to produce an aggregated-spectrum signal including at least first and second signals in respective first and second spectral bands. The modulated data is transmitted in the first and second signals at respective first and second power levels.

The second power level is adjusted separately from the first power level.

Another embodiment that is described herein provides a method for communication:

In a wireless communication terminal, data is modulated to produce an aggregated-spectrum signal including at least first and second signals in respective first and second spectral bands. The modulated data is transmitted in the first and second spectral bands at respective first and second power levels.

One or more instructions to set the first power level are received at the wireless communication terminal.

The first power level is set separately from setting the second power level, wherein the first power level is set based on the instructions.

In an embodiment, each of the signals conforms to an Evolved Universal Terrestrial Radio Access (E-UTRA) specification. In a disclosed embodiment, the method includes receiving at the wireless communication terminal one or more additional instructions to set the second power level, and setting the second power level based on the additional instructions. In an embodiment, receiving the one or more additional instructions includes receiving the additional instructions to set respective power levels of additional signals other than the first and second signals, and setting the power levels of the first and second signals and of the additional signals separately based on the instructions and the additional instructions. In some embodiments, the signals are divided into two or more subsets, and receiving the instructions includes receiving a single power level setting for the signals includes in each of the subsets. In an embodiment, transmitting the modulated data includes transmitting the modulated data in the first and second non-contiguous spectral bands.

Yet another embodiment that is described herein provides a wireless communication terminal, including a transmitter, a receiver and a processor.

The transmitter modulates data to produce an aggregated-spectrum signal including at least first and second signals in respective first and second spectral bands, and transmits the modulated data in the first and second signals at respective first and second power levels.

The receiver receives one or more instructions to set the first power level.

The processor sets the first power level separately from setting the second power level, wherein the first power level is set based on the instructions.

Another disclosed embodiment provides a wireless communication terminal, including a transmitter and a processor.

The transmitter modulates data to produce an aggregated-spectrum signal including at least first and second signals in respective first and second spectral bands and transmits the modulated data in the first and second signals at respective first and second power levels.

The processor adjusts the second power level separately from the first power level.

An additional embodiment that is described herein provides a method for communication:

In a wireless communication terminal, data is modulated to produce an aggregated-spectrum signal including at least first and second signals in respective first and second spectral bands, each of which includes a plurality of sub-carriers. The modulated data is transmitted in the first and second signals at respective first and second power levels.

Downlink signals, which govern a first transmission parameter of the modulated data transmitted on the sub-carriers in the first signal, are received and processed separately from a second transmission parameter of the modulated data transmitted on the sub-carriers in the second signal.

Yet another embodiment that is described herein provides a mobile communication terminal, including a transmitter and a power control module.

The transmitter transmits modulated data over at least first and second signal carriers in an aggregated spectrum during a time interval.

The power control module controls a power characteristic of the modulated data transmitted on the first signal carrier separately from the power characteristic of the modulated data transmitted on the second signal carrier.

Another embodiment that is described herein provides a base station, including a receiver, a transmitter and a processor.

The receiver receives from a wireless communication terminal at least first and second carriers, over which data has been modulated and which have been transmitted during a communication time interval at respective first and second power levels.

The processor produces one or more instructions to set the first power level separately from setting the second power level.

The transmitter transmits the one or more instructions to the wireless communication terminal.

An additional embodiment that is described herein provides a communication system.

The communication systems includes a base station and a wireless communication terminal.

The wireless communication terminal includes a transmitter, a receiver and a processor.

The transmitter modulates data to produce an aggregated-spectrum signal including at least first and second signals in respective first and second spectral bands, and transmits the modulated data in the first and second signals at respective first and second power levels to a base station.

The receiver receives from the base station one or more instructions to set the first power level.

The processor sets the first power level separately from setting the second power level, wherein the first power level is set based on the instructions.

Yet another embodiment that is described herein provides a communication system.

The communication system includes a base station and a wireless communication terminal.

The wireless communication terminal includes a transmitter and a processor.

The transmitter modulates data to produce an aggregated-spectrum signal including at least first and second signals in respective first and second spectral bands, and transmits the modulated data in the first and second signals at respective first and second power levels to the base station.

The processor adjusts the second power level separately from the first power level.

An additional embodiment that is described herein provides a method for communication.

In a wireless communication terminal, data is modulated to produce an aggregated-spectrum signal including at least first and second signals in respective first and second spectral bands. The modulated data is transmitted in the first and second spectral bands at respective first and second power levels.

Downlink signals are received at the wireless communication terminal.

The first power level is set based on the second power level and on measurements performed on the downlink signals.

Yet another embodiment that is described herein provides a wireless communication terminal, including a transmitter, a receiver and a processor.

The transmitter modulates data to produce an aggregated-spectrum signal including at least first and second signals in respective first and second spectral bands, and transmits the modulated data in the first and second signals at respective first and second power levels.

The receiver receives downlink signals.

The processor performs measurements on the downlink signals and sets the first power level based on the second power level and on the measurements.

The present disclosure will be more fully understood from the following detailed description of the embodiments thereof, taken together with the drawings in which:

BRIEF DESCRIPTION OF THE DRAWINGS

FIG. 2 is a flow chart that schematically illustrates a method for uplink power control in a spectrum aggregation system, in accordance with an embodiment that is described herein;

FIG. 3 is a block diagram that schematically illustrates a wireless terminal that employs spectrum aggregation with uplink power control, in accordance with an embodiment that is described herein; and FIGS. 4-6 are block diagrams that schematically illustrate wireless terminal transmitter chain configurations, in accordance with embodiments that are described herein.

DETAILED DESCRIPTION OF EMBODIMENTS

In a typical wireless spectrum aggregation system, data is transmitted over two or more spectral bands. A Radio Frequency (RF) carrier signal is associated with each of these spectral bands, and data is modulated over each carrier. The two or more spectral bands may be contiguous or non-contiguous. For example, in LTE-A spectrum aggregation, each carrier conforms to the E-UTRA specification, cited above. As noted above, accurate uplink power control is important for maintaining optimum system performance. When using spectrum aggregation, each uplink carrier may experience different channel conditions (e.g., different path loss and/or interference), even though the different carriers are transmitted between the same two endpoints. Therefore, the optimum transmit power level may differ from one uplink carrier to another.

Embodiments that are described hereinbelow provide methods and systems for uplink power control in spectrum aggregation systems. The methods and systems described herein control the power levels of the different uplink carriers, so as to match the specific conditions of each carrier. As a result, system performance, such as capacity, spectral efficiency and interference mitigation, are not compromised by carrier-to-carrier variations.

In some embodiments, the wireless terminal calculates and sets the transmit power level of each uplink carrier in response to instructions received from a base station. The base station may comprise a cellular base station or any other suitable access point connected to a network. The instructions may comprise, for example, incremental closed-loop instructions to increase or decrease the power level of a given carrier, based on measurements performed by the base station on the received uplink signal. Additionally or alternatively, the terminal may measure the downlink signal received from the base station, estimate the downlink path loss and set the power level of a given uplink carrier based on the estimated downlink path loss. In this embodiment, the instructions provided by the base station may comprise corrections that are to be applied in open-loop to the estimated path loss.

In some embodiments, the base station sends closed-loop instructions and/or open-loop corrections individually for each uplink carrier. In alternative embodiments, the carriers are divided into groups, and the base station sends instructions per carrier group. This feature reduces the amount of signaling information that is transmitted over the downlink. Generally, the terminal and the base station may operate open-loop and/or closed-loop processes per each individual carrier, per each carrier group and/or jointly for all carriers. Several examples of wireless terminal configurations, which carry out uplink power control of aggregated carriers, are described herein.

Figure 1:
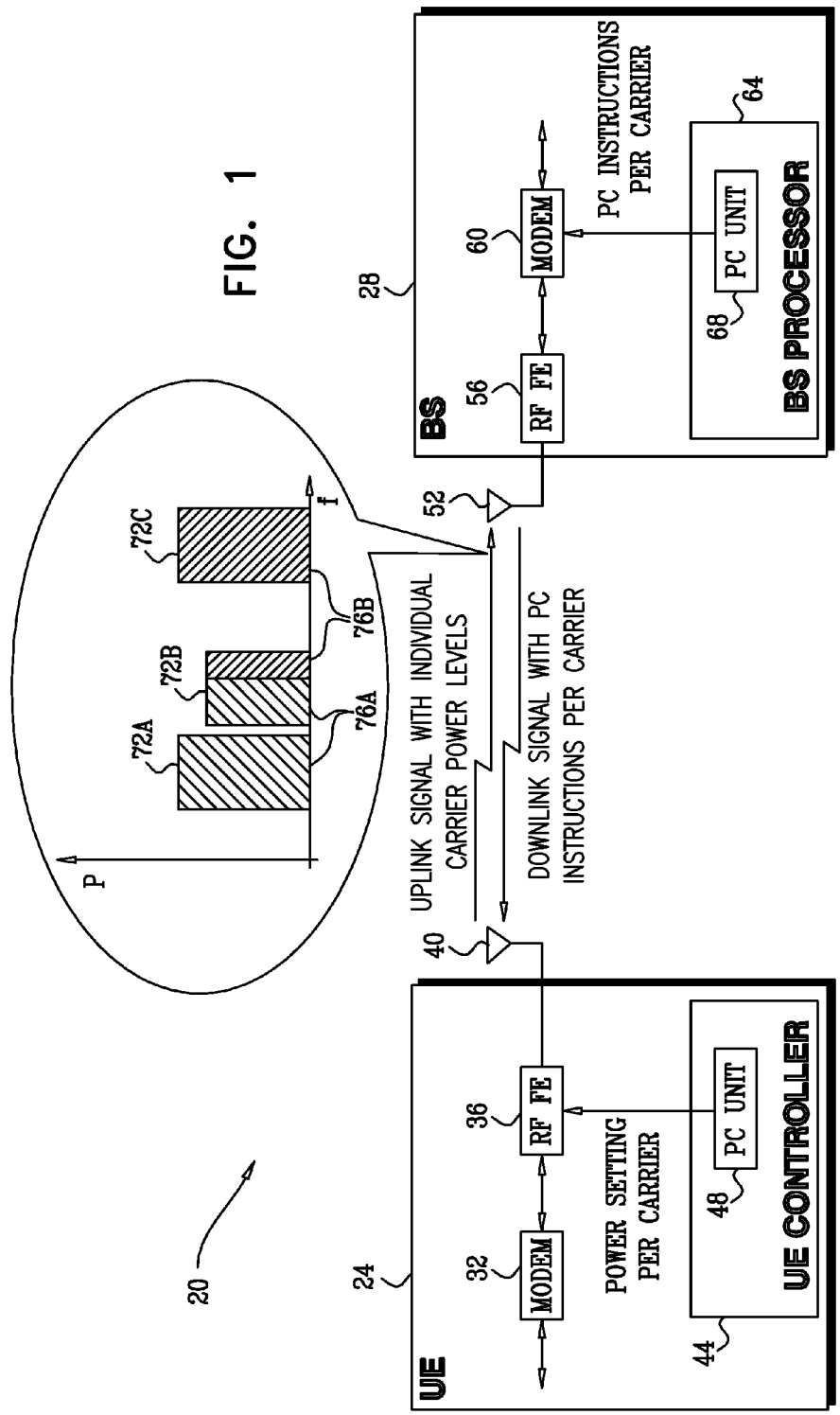
FIG. 1 is a block diagram that schematically illustrates a wireless communication system that employs spectrum aggregation, in accordance with an embodiment that is described herein.

FIG. 1 is a block diagram that schematically illustrates a wireless communication system 20 that employs spectrum aggregation, in accordance with an embodiment that is described herein. System 20 comprises a wireless communication terminal 24, which communicates with a Base Station 28 over a wireless channel. In the present example, system 20 comprises an Long Term Evolution Advanced (LTE-A) system, in which terminal 24 is referred to as a User Equipment (UE) and BS 28 is referred to as an enhanced Node-B (eNodeB). In alternative embodiments, however, system 20 may conform to any other suitable communication standard or specification. For example, system 20 may comprise a WiFi system operating in accordance with the IEEE 802.11 specification, a WiMAX system operating in accordance with the IEEE 802.16 specification, or a Mobile Broadband Wireless Access (MBWA) system operating in accordance with the IEEE 802.20 specification. The example of FIG. 1 refers to only a single UE and a single BS for the sake of clarity, although real-life systems typically comprise multiple UEs and multiple BSs.

In accordance with an embodiment, system 20 employs spectrum aggregation, meaning that UE 24 and BS 28 may communicate over multiple carriers simultaneously. When using spectrum aggregation, UE 24 transmits to the BS an uplink signal, which comprises two or more aggregated spectral bands. Each spectral band is referred to herein as a carrier or a component carrier. Each such carrier may comprise multiple sub-carriers, such as in LTE systems in which each carrier comprises multiple Orthogonal Frequency Division Multiplexing (OFDM) sub-carriers. Note that in some embodiments (e.g., OFDM), transmission within each carrier is performed in designated time/frequency bins. In some cases, the time bins allocated in different carriers do not necessarily overlap, even though the carriers are transmitted simultaneously. The term "simultaneously" should be understood as referring to such scenarios, as well.

UE 24 may transmit any number of aggregated carriers. The carriers may be transmitted in adjacent or non-contiguous spectral bands. Typically, each carrier has a bandwidth in the range of 1.4-20 MHz, although other suitable bandwidths can also be used. Communication over multiple aggregated carriers provides high bandwidth, e.g., up to 100 MHz. The description that follows focuses on spectrum aggregation in the uplink channel (i.e., from the UE to the BS). Typically, however, spectrum aggregation is applied in both uplink and downlink channels.

UE 24 comprises a modulator/demodulator (modem) 32, which modulates data to be transmitted over the uplink channel. The modulated data is provided to a UE Radio Frequency Front End (RF FE) 36, which typically converts the digital modem output to an analog signal using a suitable Digital to Analog Converter (DAC), up-converts the analog signal to RF and amplifies the RF signal to the appropriate transmission power. The RF FE may also perform functions such as filtering, as is known in the art. The RF signal at the output of RF FE 36 is transmitted via a BS antenna 40 toward UE BS 28.

UE 24 further comprises a UE controller 44, which configures and controls the different elements of the UE. In particular, controller 44 comprises a Power Control (PC) unit 48, which computes and sets the transmission power of each carrier transmitted by the UE, using methods that will be explained in greater detail below.

The RF signal transmitted from the UE is received at the BS by a BS antenna 52, and is provided to a BS RF FE 56. RF FE 56 down-converts the received RF signal to a suitable low frequency (e.g., to baseband), and digitizes the signal using a suitable Analog to Digital Converter (ADC). The digitized signal is provided to a BS modem 60, which demodulates the signal and attempts to reconstruct the data that was provided to modem 32 at the UE. BS 28 further comprises a BS processor 64, which configures and controls the different elements of the BS. In particular, processor 64 comprises a PC unit 68, which sends PC-related instructions to the UE, as will be explained further below.

The description above refers to uplink transmission, i.e., transmission from the UE to the BS. On downlink transmission, the different elements of the UE and BS typically perform the opposite functions. In other words, BS modem 60 modulates the uplink signal. RF FE 56 up-converts the signal to RF and transmits the signal toward the UE via antenna 52. The downlink RF signal is received by UE antenna 40, down-converted by RF FE 36 and demodulated by UE modem 32. The configuration of UE 24 and BS 28 shown in FIG. 1 is a simplified example configuration, which was chosen for the sake of conceptual clarity. In alternative embodiments, any other suitable UE and BS configurations can be used. Several examples of the internal structure and functionality of UE 24 are shown in FIGS. 3-6 below.

Typically, UE controller 44 and BS processor 64 comprise general-purpose processors, which are programmed in software to carry out the functions described herein. The software may be downloaded to the processors in electronic form, over a network, for example, or it may, alternatively or additionally, be provided and/or stored on tangible media, such as magnetic, optical, or electronic memory. Additionally or alternatively, elements of controller 44 and processor 64 may be implemented in hardware or firmware, such as using Application-Specific Integrated Circuits (ASICs) or other hardware components.

In the example of FIG. 1, UE 24 transmits an aggregated signal, which comprises three LTE-compliant carriers 72A . . . 72C. Generally, the UE may allocate bandwidth over any of the carriers to transmission of data items in any desired manner. In the present example, a data item 76A is transmitted over carrier 72A and some of the bandwidth (i.e., some of the sub-carriers) of carrier 72B. Another data item 76B is transmitted over some of the bandwidth of carrier 72B, as well as over carrier 72C.

The multiple uplink carriers transmitted by UE 24 are all transmitted between the same two endpoints. Nevertheless, in many practical cases, different carriers in the aggregated signal experience different channel conditions. For example, the path loss between the UE and the BS may differ from one carrier to another, such as because of different propagation or multipath effects that vary over frequency. The difference in path loss is particularly noticeable when the carriers occupy non-contiguous, widely-spaced frequency bands. As another example, different carriers may suffer from different levels of interference (e.g., interference from other UEs, which may communicate with the same BS or with other BSs). As yet another example, different carriers may have different transmission characteristics (e.g., different modulation or error correction coding).

As noted above, accurate setting of the carrier transmission power level is important for optimizing the performance of system 20. Since different carriers in the aggregated signal may experience different conditions, the optimal transmit power level may also differ from one carrier to another. Embodiments that are described herein provide methods and systems for performing uplink power control in spectrum aggregation systems. The methods and systems described herein compute and set the transmit power level individually per carrier, so that the UE transmits each carrier at a power level that matches its specific conditions. As can be seen in the example of FIG. 1, carriers 72A . . . C have different power levels, which are determined and set to match the specific conditions of each carrier.

In the example embodiment of FIG. 1, each carrier conforms to the E-UTRA specification. Each carrier comprises multiple sub-carriers that are modulated using OFDM. In such embodiments, the power control methods described herein preserve the relative power ratios among the individual sub-carriers within a given carrier.

In some embodiments, the power level of a given uplink carrier may be determined using an open-loop process and a closed-loop process, which operate concurrently with one another. In the open-loop process, the UE measures the downlink signal received from the BS and estimates the path loss for the carrier in question. Assuming that the downlink path loss is indicative of the uplink path loss, the UE uses the estimated path loss to set the appropriate transmit power level of the uplink carrier.

Typically, the UE periodically corrects the uplink carrier power level (which was computed based on the estimated downlink path loss) by a correction factor that is provided by the BS. The correction factor is typically signaled to the UE using higher link layers, e.g., using Radio Resource Control (RRC) signaling. The correction factor may serve various purposes. For example, the BS may apply a policy in which UEs at the edge of the cell transmit at a lower power level in order to reduce interference to neighboring cells. In order to enforce such a policy, the BS may send to the UE a correction factor, which depends on the distance between the UE and the BS. Additionally or alternatively, the correction factor may account for errors and inaccuracies of the path loss estimation performed by the UE.

In the closed-loop process, the BS sends to the UE instructions to increase or decrease the power level on a given uplink carrier, based on measurements performed by the BS on the received uplink signal. The UE decodes these instructions (sometimes referred to as Transmit Power Control—TPC) and adjusts the power level of the given carrier accordingly. The closed-loop instructions are typically incremental, i.e., request the UE to increase or decrease the carrier power level by a certain increment, e.g., 1 dB.

The open-loop and closed-loop processes typically operate concurrently with one another, but at different time constants. The open-loop corrections (i.e., the corrections that are to be applied to the uplink power levels based on the estimated downlink path loss) are typically applied by the UE only occasionally, at relatively large time intervals (e.g., on the order of seconds, although other time constants can also be used). The closed-loop process, on the other hand, provides TPC instructions at a relatively high rate in comparison with the open-loop corrections. Note that is some cases only the closed-loop process is active and the open-loop process is inhibited. In other cases, the open-loop process may be given varying weights. For example, in the above-cited LTE specification, a parameter denoted $\alpha$ controls the weight given to the open-loop process ($\alpha=1$ means that both open-loop process is active and receives full weight, $\alpha=0$ means that only the closed-loop is active).

For example, in some implementations each cell has a constant set of open-loop correction factors, which are updated when the UE hands-off to a different cell but remain constant otherwise. The UE may estimate the downlink path at any desired rate, such as every few seconds. These time intervals may change, for example as a function of the distance between the UE and the BS. In a typical implementation, the update rate of the closed loop is usually in the range of 20 Hz to 1 kHz, with a typical rate of 100 Hz, although any other suitable update rate can also be used. The exact rate depends on the Node-B strategy The UE sets the transmit power level of each uplink carrier using both processes, i.e., based on both the open-loop correction factor provided by the BS and on the closed-loop TPC instructions.

In some embodiments, the BS and UE may operate an open-loop process and a closed-loop process for each carrier, independently of open- and closed-loop processes of other carriers. In these embodiments, the BS sends open-loop correction factors and closed-loop instructions separately for each carrier. The UE receives and processes the open-loop correction factors and closed-loop instructions and adjusts the power levels of the different carriers accordingly.

In alternative embodiments, the BS and UE operate a common closed-loop process for all the uplink carriers, and separate open-loop processes per carrier. In these embodiments, the BS transmits closed-loop instructions that apply to all carriers that are aggregated by the UE. In addition, the BS transmits a separate open-loop correction factor for each carrier. The UE sets the transmit power level of a given carrier based on the correction factor corresponding to this carrier and on the common closed-loop instructions. Sending common closed-loop instructions to multiple carriers reduces the amount of signaling information that is sent over the downlink, especially since the closed-loop instructions are sent at relatively frequent intervals.

In some embodiments, the amount of signaling information sent over the downlink is reduced by dividing the uplink carriers into groups. In these embodiments, the uplink carriers transmitted by the UE are divided into two or more groups, and the BS and UE operate a common closed-loop process for each group. In these embodiments, the BS transmits closed-loop instructions applying to all the carriers in a given group, without duplicating the instructions for each carrier in the group. The UE receives the closed-loop instructions and calculates the power level of a given uplink carrier based on the closed-loop instructions corresponding to the group to which the carrier belongs.

The number of groups, the number of carriers in each group and the mapping of carriers to groups can be selected in any desired manner. For example, it may be advantageous to map carriers that occupy nearby frequencies to the same group, since the channel conditions experienced by these carriers are more likely to be similar. Consequently, applying the same closed-loop instructions to such a group of carriers is more likely to be accurate.

When the closed-loop process is common to two or more carriers, the BS may send to the UE power offsets to be applied to these different carriers. In these embodiments, the UE sets the power level of a given carrier based on the common closed-loop instructions, but applies a carrier-specific power offset to each carrier. Typically, the power offsets are signaled to the UE via higher layers (e.g., using RRC signaling), similarly to the open-loop correction factors.

In some embodiments, the UE determines the power level of a given uplink carrier based on (1) the power level of another uplink carrier transmitted by the UE, and (2) downlink signal measurements performed by the UE. This sort of technique is useful, for example, when the UE adds a new uplink carrier to the spectrum-aggregated signal, which already comprises one or more existing carriers. In such a scenario, the UE does not yet have closed-loop information from the BS, since the new carrier was not yet measured by the BS. The power levels of the existing carriers, on the other hand, are typically already set to the desired values. Therefore, the UE may set the initial power level of the new carrier relatively to the power levels of the existing carriers. In some embodiments, the UE corrects this initial power level based on inter-carrier power offsets that can be estimated from open-loop measurements on the downlink signals.

The above-mentioned embodiments are described by way of example. These embodiments focus mainly on reducing the number of closed-loop instructions sent over the downlink, since these instructions are relatively frequent and consume more downlink resources in comparison with open-loop correction factors. In alternative embodiments, however, the BS and UE may operate closed-loop and/or open-loop processes for any desirable carrier or group of carriers. For example, the power level of some carriers may be set using only open-loop or using only closed-loop processing. As another example, the BS may transmit common open-loop corrections that apply to two or more carriers.

The selection of an appropriate power control loop configuration may depend on various system considerations. For example, in some system configurations the carrier aggregation may be different in the uplink and in the downlink. In these system configurations, the downlink path loss may not accurately indicate the uplink path loss, and therefore the open-loop process may produce relatively large errors. In these configurations it may be preferable to operate a separate closed-loop process for each uplink carrier in order to compensate for these errors.

The open-loop process may also produce relatively large errors in systems in which the uplink and downlink are multiplexed using Frequency Division Duplex (FDD), since the uplink and downlink frequencies are different. A dedicated closed-loop process per uplink carrier may be preferable in these configurations, as well. In system configurations that multiplex the uplink and downlink using Time Division Duplex (TDD), operating a closed-loop process per a group of carriers (or even for all carriers) may be sufficient. As noted above, this choice may also depend on the frequency separation between uplink carriers.

FIG. 2 is a flow chart that schematically illustrates a method for uplink power control in spectrum aggregation system 20, in accordance with an embodiment that is described herein. Operations 80-88 below illustrate the open-loop process, and operations 92-96 below illustrate the closed-loop process. Typically, the two processes are carried out concurrently. (As noted above, the open-loop process may sometimes be inhibited, in which case operations 80-88 below are omitted.) The open-loop process begins with UE 24 receiving open-loop correction factors from BS 28, at an open-loop reception operation 80. Each open-loop correction may apply to a single uplink carrier or to a group of carriers. Additionally or alternatively, in embodiments in which a closed-loop process is operated jointly for two or more carriers, the UE may receive from the BS power offsets to be applied to each of these carriers. The open-loop correction factors and/or power offsets are typically provided to the UE using higher layer signaling, such as RRC signaling.

The UE measures the downlink signal received from the BS and estimates the downlink path loss, at a path loss estimation operation 84. The UE may estimate the downlink path loss by measuring the downlink signal strength (sometimes referred to as Received Signal Strength Indication—RSSI). Additionally or alternatively, the UE may measure the signal strength only over pilot symbols transmitted in the downlink signal. This measure is sometimes referred to as Reference Signal Received Power—RSRP). Further additionally or alternatively, the UE may perform any other suitable measurements for assessing the downlink path loss. The path loss may be estimated per each carrier or group of carriers. The UE applies the open-loop correction factors to the corresponding measured path losses, at an open-loop factoring operation 88. The result of operation 88 is a set of one or more path losses, one for each carrier or group of carriers, which are adjusted based on a factor specified by the BS.

The closed-loop process begins with the UE receiving from the BS closed-loop TPC instructions, at a closed-loop reception operation 92. The closed-loop instructions request the UE to increase or decrease the power level on a given uplink carrier or group of carriers, based on measurements performs by the BS on the received uplink signal, as explained above. The UE decodes the closed-loop instructions and computes the appropriate correction to be applied to each uplink carrier, at a closed-loop computation operation 96.

At this point, the UE possesses both open-loop corrections and closed-loop instructions, which are to be applied to each uplink carrier. Based on these parameters, the UE calculates the power level of each uplink carrier, at a power level computation operation 100. The UE configures its transmitter to transmit each carrier at the computed power level.

In some embodiments, the UE sets the power level of a given Physical Uplink Shared Channel (PUSCH) in a given LTE subframe on a given uplink carrier, which is associated with a given carrier group, according to the following formula:

$$P_{PUSCH}(i,c) = \min\{P_{MAX}, 10\log_{10}(M_{PUSCH}(i)) + P_{O\_PUSCH}(c) + \alpha(c) \cdot PL(c) + \Delta_{TF}(i,c) + f(i,g)\} \quad \text{Equation 1}$$

The above formula uses a notation similar to the notation used in section 5.1.1.1 of the 3GPP TS 36.213 v8.4.0 specification, cited above. $P_{PUSCH}(i,c)$ is expressed in dBm. i denotes a subframe index, c denotes an index of the uplink carrier, and g denotes an index of the carrier group for which a closed-loop process is operated jointly. $P_{MAX}$ denotes the maximum power allowed to the power class to which the UE belongs. $M_{PUSCH}(i)$ denotes the bandwidth of the PUSCH resource assignment, expressed as a number of resource blocks that are valid for subframe i. $P_{PUSCH}(c)$ denotes a parameter composed of the sum of a cell-specific nominal component $P_{O\_NOMINAL\_PUSCH}$, which is signaled from higher UE layers, and a UE-specific component $P_{O\_UE\_PUSCH}(c)$ for the c-th carrier, which is configured by RRC signaling.

$\alpha(c) \in \{0, 0.4, 0.5, 0.6, 0.7, 0.8, 0.9, 1\}$ denotes a cell-specific parameter for the c-th carrier, which is provided by the higher layers. PL(c) denotes the downlink path loss estimate of the c-th carrier, as estimated by the UE. $\Delta_{TF}(i,c) = 10 \log_{10}(2^{MPR(i) \cdot K_S(c)} - 1)$, wherein $K_S(c)$ denotes a cell-specific parameter for the c-th carrier given by RRC. MPR(i) is a parameter defined in the 3GPP TS 36.213 specification. Let $\delta_{PUSCH}$ denote the transmit power correction value per group of carriers, which is provided to the UE in the closed-loop TPC instructions.

If the UE-specific parameter Accumulation-enabled, which is provided by higher layers as defined in the 3GPP TS 36.213 specification, indicates that accumulation is enabled, the current PUSCH power control adjustment state for the g-th group is given by $f(i,g) = f(i-1,g) + \delta_{PUSCH}(i-K_{PUSCH}, g)$, wherein $f(0,g) = 0$, $\delta_{PUSCH}(i-K_{PUSCH}, g)$ was signaled on subframe $i-K_{PUSCH}$, and $K_{PUSCH}$ is defined in the 3GPP TS 36.213 specification.

Otherwise, i.e., if accumulation is not enabled, the current PUSCH power control adjustment state for the g-th group is given by $f(i,g) = \delta_{PUSCH}(i-K_{PUSCH}, g)$, wherein $\delta_{PUSCH}(i-K_{PUSCH}, g)$ was signaled on subframe $i-K_{PUSCH}$.

Alternatively, the UE can calculate the transmit power of a given carrier using any other suitable method or formula. The UE transmits the uplink signal, at an uplink transmission operation 104. The uplink signal comprises multiple aggregated LTE-A carriers, with each carrier transmitted at the power level determined at operation 100 above. Since the UE and BS operate individual open- and/or closed-loop processes for each carrier or group of carriers, the power level of any given uplink carrier matches the specific conditions seen by this carrier. As a result, highly accurate uplink power control can be achieved.

FIG. 3 is a block diagram that schematically illustrates an example of an internal structure of UE 24, in accordance with an embodiment that is described herein. In the example of FIG. 3, the UE comprises a transmitter 110 and a receiver 114, which interact with higher UE layers 118, as well as with RF FE 36.

Receiver 114 comprises a receive (RX) path 122, which accepts a received and down-converted downlink signal from RF FE 36. The RX path (typically implemented as part of modem 32 of FIG. 1 above) demodulates the signal and provides the data and control information conveyed by the signal to the higher UE layers.

The receiver further comprises a signal measurement unit 126, which measures the downlink signal strength. Unit 126 can measure, for example, the RSSI or RSRP of the downlink signal, or any other suitable signal measure. The signal measurement results are provided to a path loss estimation unit 130, which computes an estimate of the downlink path loss and provides path loss estimates to transmitter 110. Receiver 114 further comprises a TPC decoder 134, which decodes the closed-loop TPC instructions received from the BS. Decoder 134 provides the closed-loop power corrections conveyed in these instructions to transmitter 110. As noted above, any of the TPC instructions, downlink signal strength measurements and/or path loss estimates may apply jointly to all uplink carriers, to an individual carrier or to a specified group of carriers.

Transmitter 110 comprises a transmit (TX) path 142, which accepts data and control information for transmission from the higher UE layers, modulates the data over multiple aggregated LTE-A carriers and provides the spectrum-aggregated signal to RF FE 36. The TX path is typically implemented as part of modem 32 of FIG. 1.

Transmitter 110 further comprises a Power Control (PC) unit 138, similar in functionality to unit in FIG. 1 above. The PC unit receives downlink path loss estimates from path loss estimation unit 130 and closed-loop power corrections from decoder 134. In addition, PC unit 138 accepts open-loop corrections from a PC setup function in the higher UE layers. Based on the various open-loop and closed-loop parameters, PC unit 138 computes the desired power level of each uplink carrier using the methods described above.

The PC unit typically controls TX path 142 and/or RF FE 36, so as to cause the UE to transmit each uplink carrier at its designated power level. The PC unit can configure the power level of a given carrier by setting the digital gain of the TX path and/or the analog gain of the RF FE for transmitting this carrier. In some embodiments, the TX path has at least one configurable digital gain stage, and the PC unit controls the digital gain of the TX path to set the desired carrier power level. Additionally or alternatively, the RF FE may comprise at least one configurable analog gain stage, whose analog gain is controlled by the PC unit. Several example transmitter configurations having configurable digital and analog gain stages are described in FIGS. 4-6 below.

The configuration of UE 24 seen in FIG. 3 is an example configuration, which is chosen for the sake of conceptual clarity. In other embodiments, any other suitable UE configuration can also be used. The different elements shown in FIG. 3 can be implemented in suitable dedicated hardware, in software running on general-purpose hardware, or using a combination of hardware and software elements.

FIG. 4 is a block diagram that schematically illustrates an uplink transmitter chain 150 in UE 24, in accordance with an embodiment that is described herein. Referring to FIG. 3 above, the transmitter chain comprises elements belonging to TX path 142, as well as elements belonging to RF FE 36. Transmitter chain 150 comprises a digital transmitter (modulator) 154, which produces a baseband digital signal. The output of transmitter 154 (denoted TxData) is amplified by a configurable digital gain stage 158. The digital gain of stage 158 is set by PC unit 138 of FIG. 3.

The output of digital gain stage 158 is converted to an analog signal by a Digital-to-Analog (D/A) converter 162. In the present example, D/A 162 comprises a pair of converters, which produce an In-phase/Quadrature (I/Q) signal. The I/Q signal is processed by an analog unit 166, which typically comprises one or more filters and one or more amplifiers. Unit 166 has a configurable analog gain, which is set by PC unit 138. The output of unit 166 is up-converted by a mixer 170 to the desired Radio Frequency (RF). The mixer up-converts the signal by mixing it with a suitable Local Oscillator (LO) signal. The RF signal is then amplified by a Power Amplifier (PA) 174. The PA output is fed to UE antenna 40.

In some embodiments, the UE may comprise multiple transmitter chains 150, and each uplink carrier is transmitted by a separate transmitter chain. The power level at which the carrier is transmitted depends on the values of the digital gain and the analog gain that are set by PC unit 138. A given power level can be reached using various combinations of digital and analog gain values. However, some combinations are often preferred. For example, digital gain adjustment often has high resolution, is easy to implement and does not introduce I/Q mismatch. On the other hand, modifying the digital gain may increase the dynamic range requirements of the analog elements of chain 150. For a chain having a limited analog dynamic range, the gain adjustments are typically split between the analog and the digital domains.

FIG. 5 is a block diagram that schematically illustrates an alternative transmitter chain configuration 176, in accordance with an alternative embodiment that is described herein. The example of FIG. 5 refers to a dual-carrier transmitter. Most of the transmitter chain elements are duplicated per each uplink carrier, but the two carriers are amplified by a single PA 174. The outputs of mixers 170 are summed by a power combiner 178, whose output is provided to PA 174. Each transmitter chain has a separate setting of analog and digital gain, all set by PC unit 138. This configuration may be suitable, for example, when the two carriers are closely spaced in frequency.

In many practical cases, the PA has a certain power constraint when jointly transmitting the two carriers. For example, the maximum power of the signal at the PA input may not be allowed to exceed a certain level, so as to limit the level of non-linear distortion at the PA output. In some embodiments, the PC unit takes this constraint into consideration when setting the power levels of the two carriers.

Figure 6:
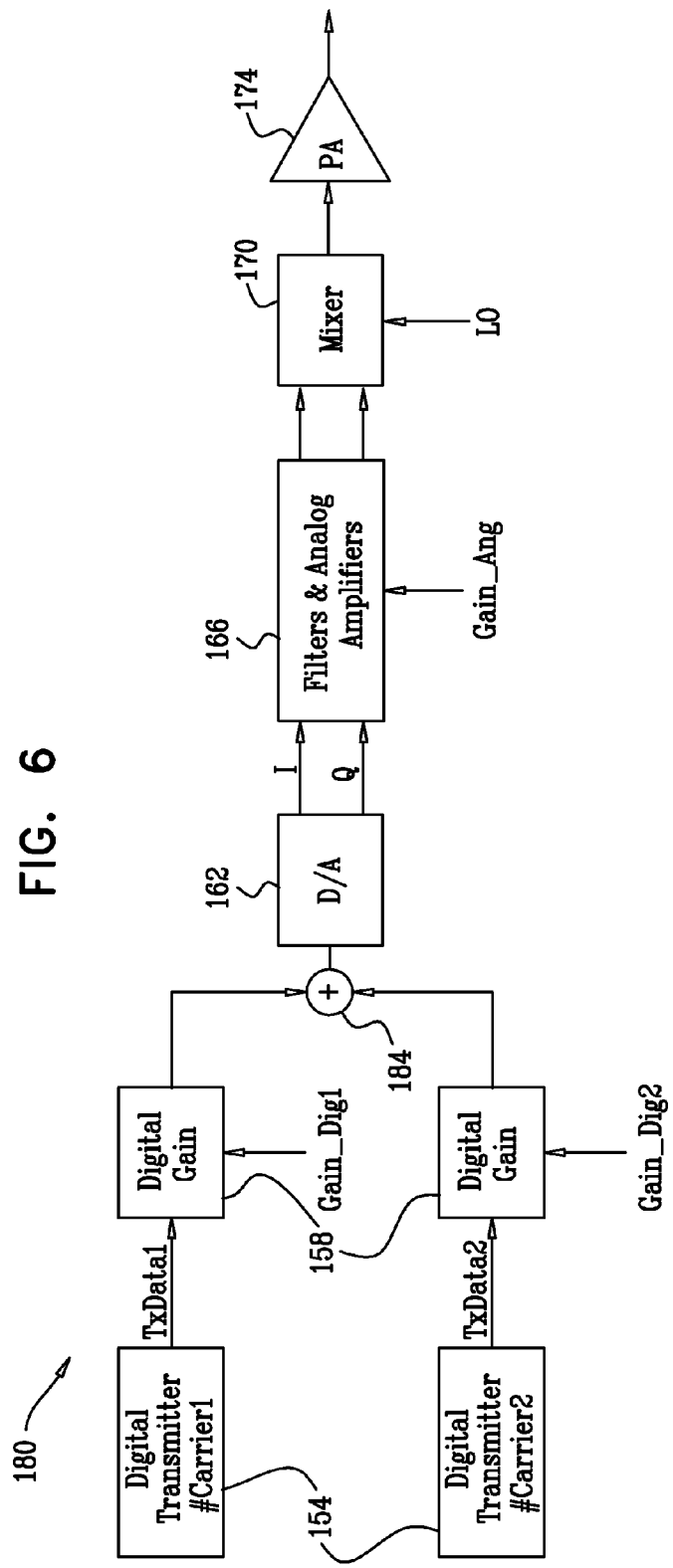

FIG. 6 is a block diagram that schematically illustrates yet another transmitter chain configuration 180, in accordance with an alternative embodiment that is described herein. In the example of FIG. 6, the digital elements of the transmitter chain are duplicated for each carrier, but the analog stages are common to the two carriers. The outputs of digital gain stages 158 are combined digitally using a combiner 184, and the composite digital signal is provided to D/A converter 162. In the present example, the configurable analog gain stage is common to the two carriers. The digital gain setting is separate for each carrier, but the analog gain is set jointly for the two carriers.

In the configuration of FIG. 6, PC unit 138 adjusts three parameters (two digital gains and one analog gain) in order to reach two desired power levels of the two carriers. For example, the PC unit may first set the power level of the carrier having the higher power using the common analog gain and the digital gain of its respective transmitter chain. Then, the power level of the second carrier can be set using only the digital gain of the second transmitter chain.

The transmitter chain configurations illustrated in FIGS. 4-6 are shown by way of example. In alternative embodiments, any other suitable configuration can also be used. For example, additionally or alternatively to sharing common analog gain stages, the transmitter chains may share common digital gain stages, as well.

Although the embodiments described herein mainly address spectrum aggregation in E-UTRA (LTE and LTE-A) systems, the principles of the present disclosure can also be used in various other types of communication systems, such as in various Universal Mobile Telecommunications System (UMTS) networks, CDMA systems such as CDMA2000, WiMAX systems, Flash OFDM (as defined in IEEE 802.20 specifications), WiFi systems (as defined in IEEE 802.11 specifications), Global System for Mobile communications General Packet Radio Service (GSM/GPRS) systems and EDGE systems.

It will thus be appreciated that the embodiments described above are cited by way of example only, and that the present disclosure is not limited to what has been particularly shown and described hereinabove. Rather, the scope of the present disclosure includes both combinations and sub-combinations of the various features described hereinabove, as well as variations and modifications thereof which would occur to persons skilled in the art upon reading the foregoing description and which are not disclosed in the prior art.

The invention claimed is:

1. A method for communication, comprising:
in a wireless communication terminal, modulating data to produce an aggregated-spectrum signal comprising multiple component carriers in multiple respective spectral bands, each component carrier comprising a respective plurality of sub-carriers in respective frequency bins, wherein the component carriers are grouped in one or more groups, and transmitting the modulated data on the multiple component carriers at respective power levels;
receiving at the wireless communication terminal a single instruction to set a power level of the component carriers in a given group; and
setting the power level of the component carriers in the given group based on the single instruction, and while preserving relative power ratios among the sub-carriers within each of the component carriers.

2. The method according to claim 1, wherein receiving the instruction comprises receiving in the single instruction a power offset to be applied between first and second component carriers in the given group, and wherein setting the power level comprises applying the power offset between the first and second component carriers.

3. The method according to claim 1, wherein the component carriers are grouped in two or more groups, and wherein setting the power level comprises configuring the power level of the component carriers in the given group separately from setting the power levels of the component carriers outside the given group.

4. The method according to claim 1, comprising receiving at the wireless communication terminal one or more additional instructions to set the power level of another group, and setting the power level of the other group based on the additional instructions.

5. The method according to claim 1, wherein transmitting the modulated data comprises transmitting the component carriers such that the multiple spectral bands are non-contiguous.

6. The method according to claim 1, wherein receiving the instruction comprises receiving an incremental correction to be applied to the power level of the component carriers in the given group, and wherein setting the power level comprises adjusting the power level of the component carriers in the given group responsively to the incremental correction.

7. The method according to claim 1, wherein setting the power level comprises measuring signals received from the base station and calculating the power level of the component carriers in the first group responsively to the measured signals, and wherein receiving the instruction comprises receiving a correction factor to be applied to the calculated power level.

8. The method according to claim 1, wherein transmitting the modulated data comprises amplifying the groups using respective transmitter chains, each of the transmitter chains having a configurable digital gain stage and a configurable analog gain stage, and comprising setting the power level of the component carriers in the given group by configuring the digital gain stage and the analog gain stage in at least one of the transmitter chains.

9. The method according to claim 8, wherein at least two of the transmitter chains share a common configurable analog gain stage.

10. The method according to claim 1, wherein each of the component carriers conforms to an Evolved Universal Terrestrial Radio Access (E-UTRA) specification.

11. Apparatus for communication, comprising:
- a transmitter, which is configured to modulate data to produce an aggregated-spectrum signal comprising multiple component carriers in multiple respective spectral bands, each component carrier comprising a respective plurality of sub-carriers in respective frequency bins, wherein the component carriers are grouped in one or more groups, and to transmit the modulated data on the multiple component carriers at respective power levels;
- a receiver, which is configured to receive a single instruction to set a power level of the component carriers in a given group; and
- a processor, which is configured to set the power level of the component carriers in the given group based on the single instruction, and while preserving relative power ratios among the sub-carriers within each of the component carriers.

12. The apparatus according to claim 11, wherein the receiver is configured to receive in the single instruction a power offset to be applied between first and second component carriers in the given group, and wherein the processor is configured to apply the power offset between the first and second component carriers.

13. The apparatus according to claim 11, wherein the component carriers are grouped in two or more groups, and wherein the processor is configured to set the power level of the component carriers in the given group separately from setting the power levels of the component carriers outside the given group.

14. The apparatus according to claim 11, wherein the receiver is configured to receive one or more additional instructions to set the power level of another group, and wherein the processor is configured to set the power level of the other group based on the additional instructions.

15. The apparatus according to claim 11, wherein the transmitter is configured to transmit the component carriers such that the multiple spectral bands are non-contiguous.

16. The apparatus according to claim 11, wherein the receiver is configured to receive in the instruction an incremental correction to be applied to the power level of the component carriers in the given group, and wherein the processor is configured to adjust the power level of the component carriers in the given group responsively to the incremental correction.

17. The apparatus according to claim 11, wherein the processor is configured to measure signals received from the base station and to calculate the power level of the component carriers in the first group responsively to the measured signals, and wherein the receiver is configured to receive in the instruction a correction factor to be applied to the calculated power level.

18. The apparatus according to claim 11, wherein the transmitter is configured to amplify the groups using respective transmitter chains, each of the transmitter chains having a configurable digital gain stage and a configurable analog gain stage, and wherein the processor is configured to set the power level of the component carriers in the given group by configuring the digital gain stage and the analog gain stage in at least one of the transmitter chains.

19. The apparatus according to claim 11, wherein each of the component carriers conforms to an Evolved Universal Terrestrial Radio Access (E-UTRA) specification.

20. A mobile communication terminal comprising the apparatus of claim 11.

* * * * *